United States Patent
Nunan et al.

(10) Patent No.: US 10,850,264 B2
(45) Date of Patent: Dec. 1, 2020

(54) HYDROCARBON TRAP CATALYST

(71) Applicant: UMICORE AG & CO. KG, Hanau-Wolfgang (DE)

(72) Inventors: John Nunan, Tulsa, OK (US); David Moser, Ortonville, MI (US); Chad Alltizer, Broken Arrow, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 88 days.

(21) Appl. No.: 15/983,212

(22) Filed: May 18, 2018

(65) Prior Publication Data

US 2019/0351397 A1 Nov. 21, 2019

(51) Int. Cl.
| | | |
|---|---|---|
| *B01D 53/94* | (2006.01) | |
| *F01N 3/08* | (2006.01) | |
| *B01J 29/76* | (2006.01) | |
| *B01J 23/00* | (2006.01) | |
| *B01J 23/44* | (2006.01) | |
| *B01J 23/63* | (2006.01) | |
| *B01J 23/89* | (2006.01) | |
| *B01J 21/04* | (2006.01) | |
| *B01J 21/08* | (2006.01) | |
| *B01J 21/10* | (2006.01) | |

(Continued)

(52) U.S. Cl.
CPC ........ *B01J 29/7615* (2013.01); *B01D 53/945* (2013.01); *B01J 35/0006* (2013.01); *B01J 35/04* (2013.01); *F01N 3/0814* (2013.01); *F01N 3/0835* (2013.01); *B01D 2255/1023* (2013.01); *B01D 2255/20738* (2013.01); *B01D 2255/502* (2013.01); *B01D 2255/902* (2013.01); *B01D 2255/9155* (2013.01); *F01N 2570/12* (2013.01)

(58) Field of Classification Search
CPC ... B01J 21/04; B01J 21/08; B01J 21/10; B01J 21/12; B01J 23/002; B01J 23/10; B01J 23/44; B01J 23/63; B01J 23/8906; B01J 23/8913; B01J 23/892; B01J 23/8926; B01J 23/894; B01J 35/0006; B01J 35/04; B01J 29/7615; B01D 53/945; F01N 3/0814; F01N 3/0835

See application file for complete search history.

(56) References Cited

U.S. PATENT DOCUMENTS

| | | |
|---|---|---|
| 5,676,912 A | 10/1997 | Sharma et al. |
| 5,772,972 A | 6/1998 | Hepburn et al. |

(Continued)

FOREIGN PATENT DOCUMENTS

| | | |
|---|---|---|
| EP | 0 782 880 A1 | 7/1997 |
| EP | 1 864 713 A1 | 12/2007 |

OTHER PUBLICATIONS

Ch. Baerlocher, et al., "Atlas of Zeolite Framework Types", 5th revised edition, 2001, ISBN: 0-444-50701-9, pp. 1-303.

(Continued)

*Primary Examiner* — Cam N. Nguyen
(74) *Attorney, Agent, or Firm* — Smith, Gambrell & Russell, LLP

(57) ABSTRACT

The present invention relates to a catalyst comprising a carrier substrate of the length L extending between substrate ends a and b and a first washcoat zone, which comprises a) a zeolite, b) a redox active base metal compound and c) palladium in oxidic or metallic state which is fixed to the surface of a support oxide.

20 Claims, 16 Drawing Sheets

(51) Int. Cl.
  *B01J 21/12* (2006.01)
  *B01J 35/00* (2006.01)
  *B01J 35/04* (2006.01)

(56) References Cited

U.S. PATENT DOCUMENTS

| | | | | |
|---|---|---|---|---|
| 6,074,973 | A | 6/2000 | Lampert et al. | |
| 7,906,449 | B2* | 3/2011 | Ando | B01J 23/63 502/66 |
| 7,998,424 | B2* | 8/2011 | Bergeal | B01D 53/945 422/180 |
| 8,087,235 | B2 | 1/2012 | Strehlau et al. | |
| 8,293,192 | B2* | 10/2012 | Sakai | B01L 3/021 422/501 |
| 8,540,952 | B2* | 9/2013 | Swallow | B01D 53/94 423/213.2 |
| 8,637,426 | B2* | 1/2014 | Hoke | B01D 53/945 502/339 |
| 8,795,617 | B2* | 8/2014 | Swallow | B01D 53/9418 423/213.2 |
| 8,906,820 | B2* | 12/2014 | Fedeyko | B01D 53/9418 502/60 |
| 9,005,560 | B2* | 4/2015 | McKenna | F01N 3/20 423/213.5 |
| 9,242,212 | B2* | 1/2016 | Phillips | B01J 35/04 |
| 9,415,344 | B2* | 8/2016 | Arnold | B01J 29/088 |
| 9,586,179 | B2* | 3/2017 | Yin | B01J 37/0244 |
| 9,597,636 | B2* | 3/2017 | Sonntag | F01N 3/106 |
| 9,611,773 | B2* | 4/2017 | Brown | B01D 53/9422 |
| 9,707,542 | B2* | 7/2017 | Bergeal | B01J 37/0244 |
| 9,849,423 | B2* | 12/2017 | Chiffey | B01J 29/7415 |
| 9,937,489 | B2* | 4/2018 | Larsson | B01J 35/9436 |
| 10,201,807 | B2* | 2/2019 | Larsson | B01J 35/0006 |
| 10,286,359 | B2* | 5/2019 | Chiffey | B01J 29/40 |
| 10,328,388 | B2* | 6/2019 | Dumbuya | B01D 53/944 |
| 2008/0227627 | A1* | 9/2008 | Strehlau | B01J 29/064 502/61 |
| 2012/0301378 | A1* | 11/2012 | Fedeyko | B01J 29/85 423/213.5 |
| 2012/0301379 | A1* | 11/2012 | Fedeyko | B01J 29/80 423/213.5 |
| 2012/0301380 | A1* | 11/2012 | Fedeyko | B01D 53/8628 423/213.5 |
| 2012/0308439 | A1* | 12/2012 | Chen | B01D 53/945 422/180 |
| 2013/0287659 | A1* | 10/2013 | Lupescu | B01J 37/0009 423/213.5 |
| 2014/0234190 | A1 | 8/2014 | McKenna | |
| 2015/0165423 | A1 | 6/2015 | Sung et al. | |
| 2018/0045097 | A1* | 2/2018 | Tang | B01J 37/0246 |
| 2018/0221860 | A1* | 8/2018 | Larsson | B01J 37/0244 |
| 2018/0353902 | A1* | 12/2018 | Chiffey | B01J 37/0228 |
| 2018/0353903 | A1* | 12/2018 | Chiffey | B01J 23/02 |
| 2019/0022584 | A1* | 1/2019 | Hilgendorff | B01J 35/0006 |
| 2019/0168189 | A1* | 6/2019 | Blakeman | B01J 37/0246 |
| 2019/0168198 | A1* | 6/2019 | Larsson | B01J 35/04 |
| 2019/0255485 | A1* | 8/2019 | Bergeal | B01D 53/9472 |

OTHER PUBLICATIONS

DIN 66132:Bestimmung der spezifischen Oberfläche von Feststoffen durch Stickstoffadsorption; Einpunkt-Differenzverfahren nach Haul and Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).
SAE International J. Engines 2013-01-1297 (vol. 6, Issue 2), Jun. 2013 "HC Traps for Gasoline and Ethanol Applications". John Nunan, et al.
International Search Report for International Patent Application No. PCT/EP2019/062600 dated Jul. 18, 2019 (6 pages).
Written Opinion of the International Search Authority for International Patent Application No. PCT/EP2019/062600 dated Jul. 18, 2019 (7 pages).

* cited by examiner

HYDROCARBON TRAP CATALYST

The present invention relates to a hydrocarbon trap catalyst for trapping hydrocarbons during cold start of combustion engines operated with a predominantly stoichiometric air/fuel ratio.

It is well known in the field of combustion engines that fuel combustion is not complete and as a result gives emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, the implementation of active strategies such as improved combustion and optimized A/F or lambda control have been carried out in an effort to decrease the emission of pollutants. Improvement of fuel-air mixing (A/F ratio) as primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and $NO_x$. Optimal use of the TWC is around Lambda=1+/−0.005 where the air/fuel ratio is equal to 14.56. Above these values, the exhaust gas is said to be lean and contains an excess of oxidants such as $O_2$ and NOx, and CO and HC are catalytically oxidized to carbon dioxide and water. Below this value, the exhaust gas is said to be rich and contains an excess of reductants such as $H_2$, CO and HCs and mainly $NO_x$ is reduced to nitrogen using e.g. CO as a reducing agent.

Optimal conversion of HC, CO and NO, is achieved at Lambda=1. However, gasoline engines operate under oscillating conditions between slightly lean and slightly rich conditions. Under purely rich conditions, the conversion of hydrocarbon drops rapidly. In order to broaden the optimal operation of a TWC, oxygen storage materials (OSMs) in the form of Cerium-Zirconium mixed oxides were included in the formulation of the TWC, Like other catalysts, three-way-catalysts are not active until they reach a certain temperature, the so-called light-off temperature, which is usually around 200° C. Below this temperature, for example during cold start, other measures need to be taken in order to avoid escape of pollutants via the tailpipe. This is of particular importance in the case of hydrocarbons because they are mainly produced during cold start.

This situation has resulted in the development of so-called hydrocarbon traps. HC traps are basically storage materials which adsorb hydrocarbons while the exhaust gas is cold and the three-way-catalyst is not yet active (for example during a cold start) and desorb and release them when the exhaust-gas temperature is higher and the three-way-catalyst has reached its light-off temperature.

Materials for storing hydrocarbons are usually zeolitic materials or so-called molecular sieves. Examples are for example mordenite (MOR), Y-zeolites (FAU), ZSM-5 (MEI), β-zeolites (BEA) and mixtures thereof. These are preferably used in H-form or $NH_4$-form or are exchanged with transition metals.

Catalyzed HC-traps integrate an oxidizing function into the storage function and preferably consist of an adsorber material containing zeolitic material and a three-way catalyst, for example in form of a separate layer, containing oxygen storage components and platinum group metals like platinum, palladium and rhodium, in many designs the adsorbent layer is located as the bottom or first layer applied to the support substrate and the TWC function as a second or overcoat top-layer. This allows for the direct oxidation of hydrocarbons desorbed and released by the adsorbing material. The oxidation can be achieved by oxygen present in the gas phase or oxygen from an "oxygen carrier" in the trap washcoat. The latter component can include redox active base metals such as those derived from the oxides of transitions metals such as Fe, Mn, Co, Ni and Cu, rare earth elements such as Ce, Pr, Sm, Tb or P block elements such as Sn and In.

EP 0 782 880 A1 discloses a catalyst-adsorbent for purification of exhaust gases comprising a monolithic carrier and a catalyst-adsorbent layer formed thereon. The catalyst-adsorbent layer comprises as a first component a catalyst for conversion of the carbon monoxide, hydrocarbons and nitrogen oxides which is mainly composed of heat-resistant inorganic oxides and at least one noble metal selected from Pt, Pd and Rh, loaded thereon. The catalyst-adsorbent layer comprises as a second component an adsorbent composed mainly of zeolite. The zeolite can be used in the form containing at least one kind of ion. Preferred zeolites contain as ions for example $Ag^+$, $Cu^2$% $Pd^{2+}$ or mixtures of two of them. $Fe^{2+}$ is disclosed as well but not exemplified.

U.S. Pat. No. 5,676,912 discloses a multizone catalyst wherein the exhaust gas is directed through a first zone, a second zone and a third zone. The first zone comprises a catalyst that is effective for the three-way conversion of nitrogen oxides, hydrocarbons and carbon monoxide. The second zone comprises materials effective to sorb hydrocarbons and preferably comprises zeolites ISM-5 or Beta that have been contacted with iron or an iron compound. The third zone comprises a catalyst effective for the oxidation of hydrocarbons and carbon monoxide.

US 2014/234190 discloses a Pd—Fe/zeolite and its use as a $NO_x$-trap.

U.S. Pat. No. 6,074,973 discloses a catalysed hydrocarbon trap which comprises palladium and silver dispersed on a high surface area metal oxide support and a zeolite material.

Figure 1:
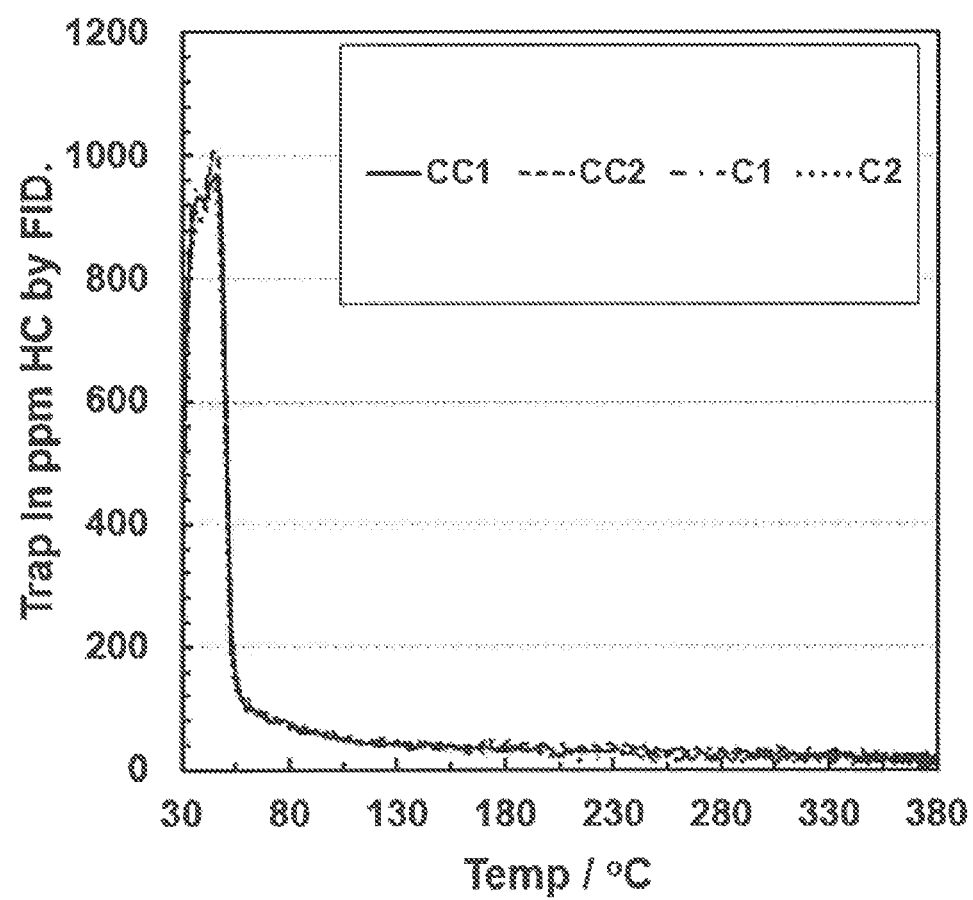
FIGS. 1 and 2 show testing procedure results wherein the total amount of hydrocarbons (HCs) going into the respective trap ("trap in") and leaving the trap ("trap out"), as measured by FID (Flame ionization detector), are shown.

The inventors of the present invention in particular dealt with the capture of small gas molecules such as ethene and propene. Typically these are desorbed by known hydrocarbon traps at too low a temperatures for oxidation over the TWC catalyst or oxidation catalyst. It is known that some base metals such as Ag can adsorb these alkenes strongly as described in U.S. Pat. No. 6,074,973. What is therefore required are catalysts which allow chemical processes that enhance adsorption of all gas molecules to higher temperatures coupled with increased thermal stability of the adsorption system as a whole. Further, during the desorption phase oxygen needs to be available for combustion of the adsorbed hydrocarbons during the desorption phase. It is proposed that the capture of small alkenes can be achieved by augmenting the conventional adsorption properties of zeolites with new chemical processes that capture both small and large molecules from the gas phase and then release them at higher temperatures than can be achieved by conventional adsorption, such as chemi-sorption. Further, during the high temperature desorption phase, the adsorbed molecules need to be effectively combusted or converted to water and $CO_2$ before desorption and escape from the trap.

Accordingly, the present invention pertains to a catalyst comprising a carrier substrate of the length L extending between substrate ends a and b and a first washcoat zone which comprises
a) a zeolite
b) a compound of a redox active base metal selected from the group consisting of Cu, Ni, Co, Mn, Fe, Cr, Ce, Pr, Tb, Sn and In, and
c) palladium in oxidic or metallic state fixed to the surface of a support oxide.

In embodiments of the present invention the zeolite of the first washcoat zone belongs to the structure type codes (as defined in the Atlas of Zeolite Framework Types, Elsevier, sixth revised edition, 2007) BEA, FAU, FER, MFI or MOR. A preferred zeolite belongs to the structure type code BEA or MFI or FAU. A preferred zeolite of the structure type code MFI is for example ZSM-5 whereas a preferred zeolite of the structure type code BEA is Beta.

Preferred zeolites have a SAR (silica-to-alumina ratio) value of 2 to 100, in particular 5 to 50. The zeolite of the first washcoat zone is preferably present in an amount of 20 to 90% by weight based on the weight of the first washcoat zone.

A preferred redox active base metal is copper, manganese and iron. A particularly preferred redox active base metal is iron.

In embodiments of the present invention the redox active base metal compound of the first washcoat zone is an oxide and present within the zeolite structure and/or on the surface of the zeolite. In particular it is present as finely divided oxide crystallites. In case the redox active base metal is iron, it is preferably present as iron oxide, which is in particular $Fe_2O_3$.

The redox active base metal compound, in particular the iron compound, of the first washcoat zone is preferably present in an amount of 1.0 to 10.0% by weight based on the weight of the first washcoat zone and calculated as metal oxide, in case of iron as $Fe_2O_3$.

For the avoidance of doubt, the redox active base metal compound of the first washcoat zone is not present in ion exchanged form.

In embodiments of the present invention the support oxide for palladium in the first washcoat zone is alumina, silica, magnesia, titania, ceria, zirconia as well as mixtures or mixed oxides comprising at least two of these materials.

Usually, they have a BET surface of 30 to 250 $m^2/g$, preferably of 100 to 200 $m^2/g$ (determined according to German standard DIN 66132), Preferred are alumina, alumina/silica mixed oxides and magnesia/alumina mixed oxides. In case alumina is used, it is preferably stabilized, for example with 1 to 6 weight percent, in particular 4 weight percent, of lanthana.

In particular preferred support oxides have oxygen storage properties and are for example ceria, ceria-zirconia mixed oxides or alumina-ceria mixed oxides.

In particular, the support oxide is selected from the group consisting of alumina, alumina/silica mixed oxides, magnesia/alumina mixed oxides, ceria, ceria-zirconia mixed oxides and alumina-ceria mixed oxides.

The support oxide of the first washcoat zone is preferably present in an amount of 1.0 to 50.0% by weight based on the weight of the first washcoat zone.

For the avoidance of doubt, the support oxide for palladium in the first washcoat zone is not a zeolite and doesn't comprise a zeolite.

Palladium of the first washcoat zone is preferably present in an amount of 0.1 to 5% by weight, based on the weight of the first washcoat zone and calculated as palladium metal.

It is of particular importance that the palladium is fixed to the surface of the support oxide in oxidic or metallic state. This can be achieved by impregnating the support oxide with a solution of a palladium salt, for example palladium nitrate, and subsequent fixation of the palladium to the surface of the support oxide via high temperature calcination. Considering the fixation of the palladium to the surface of the support oxide, the zeolite of the first washcoat zone neither comprises palladium within its zeolitic structure, nor on its surface.

In embodiments of the present invention the carrier substrate of the length L can be a flow through or a filter substrate. Such carrier substrates are usually made of cordierite or metal and are described in literature and available on the market.

In embodiments of the present invention the first washcoat zone is present in the form of a layer on the carrier substrate and extends over 70 to 100% of its length L.

The first washcoat zone can be the sole layer present in the carrier substrate. However, the carrier substrate can comprise one or more additional washcoat zones as well.

Accordingly, in embodiments of the present invention the carrier substrate comprises a first washcoat zone as described above and a second washcoat zone which comprises platinum, palladium and/or rhodium.

In preferred embodiments the second washcoat zone comprises rhodium but no platinum and no palladium. Accordingly, it is preferable to place all palladium contained in the catalyst into the first washcoat zone and all rhodium contained in the catalyst into the second washcoat zone. Preferably, both the first and the second washcoat zone are free of platinum.

In case the second washcoat zone comprises rhodium, it is usually present in the second washcoat zone in an amount of 0.04 to 4.0 g/l, preferably 1.0 to 1.8 g/l, based on the volume of the carrier substrate and calculated as rhodium metal.

Platinum, palladium and/or rhodium contained in the second washcoat zone are usually supported on a carrier material.

As carrier material all materials can be used which are known to the skilled person for that purpose. Usually, they have a BET surface of 30 to 250 $m^2/g$, preferably of 100 to 200 $m^2/g$ (determined according to German standard DIN 66132) and are in particular alumina, silica, magnesia, titania, oxygen storage materials such as Ce—Zr mixed oxides and stabilizers such as La, Ba, Nd as well as mixtures or mixed oxides comprising at least two of these materials.

Preferred are alumina, alumina/silica mixed oxides magnesia/alumina mixed oxides and Ce—Zr mixed oxides. In case alumina is used, it is preferably stabilized, for example with 1 to 6 weight percent, in particular 4 weight percent, of lanthana.

Preferably, the second washcoat zone is free of zeolite and redox active base metal, for example iron.

The second washcoat zone is usually present as a layer on the carrier substrate and extends over 70 to 100% of its length L. Preferably, it forms a layer which is on top of the first washcoat zone.

In another embodiment of the present invention the carrier substrate comprises a first washcoat zone as described above and a third washcoat zone which comprises a zeolite and is free of palladium.

Preferably, the zeolite of the third washcoat zone belongs to the structure type codes (as defined in the Atlas of Zeolite Framework Types, Elsevier, sixth revised edition, 2007) BEA, FAU, FER, MFI or MOR. A preferred zeolite belongs to the structure type code BEA or MFI or FAU. A preferred zeolite of the structure type code MFI is for example ZSM-5 whereas a preferred zeolite of the structure type code BEA is Beta.

A preferred zeolite of the FAU is an Ultra-Stable-Y (USY). Preferred zeolites have a SAR (silica-to-alumina ratio) value of 2 to 100, in particular 5 to 50. The zeolite of the third washcoat zone is preferably present in an amount of 20 to 90% by weight based on the weight of the third washcoat zone. The zeolite of third washcoat zone can comprise a redox active base metal compound, which is preferably a metal oxide and present within the zeolite structure and/or on the surface of the zeolite as finely dispersed oxide crystallites. In particular, the redox active base metal compound is an iron compound. Preferably, it is an iron oxide, in particular $Fe_2O_3$.

The third washcoat zone is usually present as a layer on the carrier substrate and extends over 70 to 100% of its length L. Preferably, it forms a layer which is below the first and second washcoat zone.

In a preferred embodiment of the present invention the carrier substrate of the length L comprises a first, a second and a third washcoat zone which are defined as aiven above. In particular, the third washcoat zone is present as a layer directly on the carrier substrate, the first washcoat zone is present as a layer on top of the third washcoat zone and the second washcoat zone is present as a layer on top of the first washcoat zone.

The catalyst of the present invention can be manufactured by known methods, in particular by a process which comprises providing a carrier substrate of the length L and
coating of the carrier substrate with a coating suspension (washcoat) which contains a zeolite, a redox active base metal compound and palladium in oxidic or metallic state which is fixed to the surface of a support oxide so as to form the first washcoat zone and
drying and optionally calcining the coated carrier substrate.

The coating is usually performed via conventional immersion, suction and pumping methods which are extensively described in literature and known to the person of skill in the art.

In case the catalyst of the present invention comprises a second and/or third washcoat zone the carrier substrate is additionally coated in an equivalent manner with the respective coating suspensions.

The inventors of the present invention do not want to be bound by theory but believe that the inventive catalyst is able to actively adsorb, dimerize and polymerize small alkenes such as ethene and propene and to react the resulting butenes and hexenes using carbenium ion chemistries to give larger molecular weight molecules that are more strongly bound to the zeolite The catalyst of the present invention is suitable for the treatment of exhaust gases of engines operated with a predominantly stoichiometric air/fuel ratio, the treatment of the exhaust gas being carried out by passing the exhaust gas over the inventive catalyst.

Accordingly, the present invention further relates to a method for treating the exhaust gas of an engine operated with a predominantly stoichiometric air/fuel ratio, characterized in that the exhaust gas is passed over an inventive catalyst.

COMPARISON EXAMPLE 1

Slurry preparation begins with addition of a commercially available alumina stabilized silica sol to water and mixing. This material represents 4.5 wt. % of the final calcined washcoat loading. This step was followed by the addition of a commercially available boehmite and iron nitrate at contents of 1.0 and 4.5 wt, % respectively of the final calcined washcoat. Finally, a beta zeolite in the ammonium form and having a SAR value of 25 was added and the slurry aged for two days. This slurry was then coated onto a ceramic substrate have 400 cpsi/6.5 mill cell structure and 4" round by 6" long giving a total volume of 1.2 liters and a washcoat load of 3.64 $g/in^3$ or 222 g/L. The hydrocarbon trap this obtained is subsequently called CC1.

COMPARISON EXAMPLE 2

To CC1 according to Comparison Example 1 was added a three-way-catalyst (TWC) overcoat comprising platinum, palladium and rhodium on a commercially available oxygen storage component (OSC) carrier.

The noble metals were fixed to the surface of the OSC by generating a slurry of the PGM nitrate salts and the OSC component with subsequent drying and calcination. The composition of the OSC was 70% $CeO_2$ and 30% $ZrO_2$. Calcination was carried out in air at 600° C. for 6 hours so the PGMs would be in either their stable metal or oxide form. The loading was Pt=0.4 wt. %, Pd=9.2 wt. % and Rh=0.2 wt. %.

The PGM loaded OSC consisted of 73% of the TWC washcoat layer. For slurry preparation and coating this PGM doped OSC was mixed with a non-stabilized theta alumina, milled and then coated onto the trap layer (CC1) giving a total TWC washcoat loading of 0.816 $g/in^3$ or 50 g/L. The total washcoat loading for obtained catalyst CC2 was 4.45 $g/in^3$ or 272 g/L.

EXAMPLE 1 a) The process described in Comparative Example 1 was repeated.
b) For the preparation of a second trap layer containing precious metal doped oxygen storage component on top of the layer obtained in step a) a washcoat was prepared in line with Comparison Example 1 with the difference that after addition of the beta zeolite a the palladium doped OSC (The composition of the OSC was 70% $CeO_2$ and 30% $ZrO_2$, same as in CC2) was now added as the final step in washcoat preparation for this layer. The palladium doped OSC consisted of 21.1 wt. % of this layer on a dry calcined basis. After coating the $2^{nd}$ layer the washcoat loading was 1.39 g/in$^3$ or 85 g/L. This gave a total loading of 5.03 g/in$^3$ or 307 g/L. The catalyst this obtained is called C1.

EXAMPLE 2

The process described in Example 1 was repeated except that only half of the palladium/OSC was included in the top or $2^{nd}$ trap layer at 12.8 wt. %. The catalyst thus obtained is called C2.

EXAMPLE 3

The process described in Example 1 was repeated except that the palladium in the top layer was impregnated onto a commercially available La stabilized alumina. The catalyst thus obtained is called C3.

Evaluation of catalysts CC1, CC2, C1 and C2
a) Aging Protocol

The catalysts were aged simultaneously on a stand dyno. Engine Dynamo-meter aging was carried out using an 8.1 L V-8 engine with MPFI. Up to four exhaust systems could be aged in parallel, one per channel. The catalyst inlet bed T was maintained at 700° C. 10° C. over each trap with an exhaust gas flow 20±2.5 g/s over each catalyst converter. The aging was run at stoichiometry without AP: oscillation and lasted 50 hours.

b) Testing.

The testing procedure as described in Nunan et. al. SAE 2013-01-4297 was used.

c) The results are given in FIGS. 1 to 16

Figure 2:
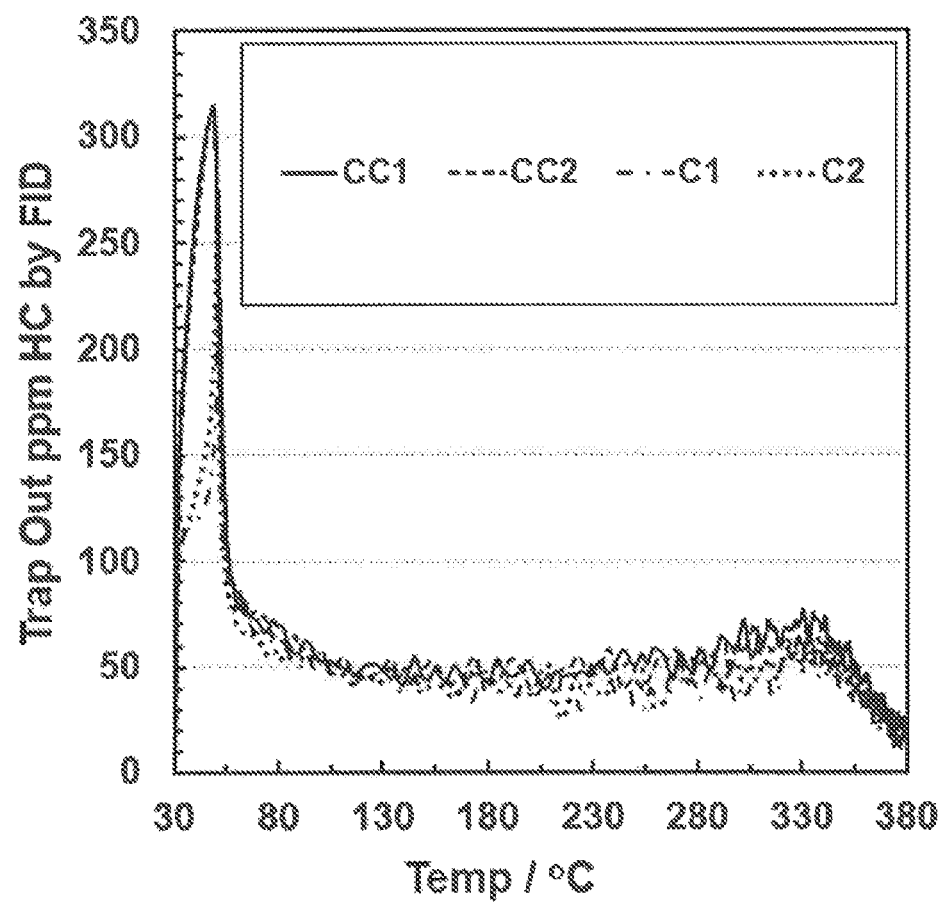

The total amount of hydrocarbons (HCs) going into the respective trap ("trap in") and leaving the trap ("trap out") as measured by FID (Flame ionization detector) are shown in FIGS. 1 and 2. The total "trap in" to the four traps C1, C2, CC1 and CC2 are identical but the "trap out" amounts are quite different. It is clearly seen that C1 and C2 have significantly reduced "trap out" emissions. Further, the "trap out" emissions for CC1 and CC2 are identical.

Thus placing the PGM/OSC as a separate layer over the HC trap has no impact on the trapping efficiency. On the other hand, when the PGM/OSC is located within the trap layer a significant reduction in "trap out" hydrocarbon emissions is seen.

Figure 3:
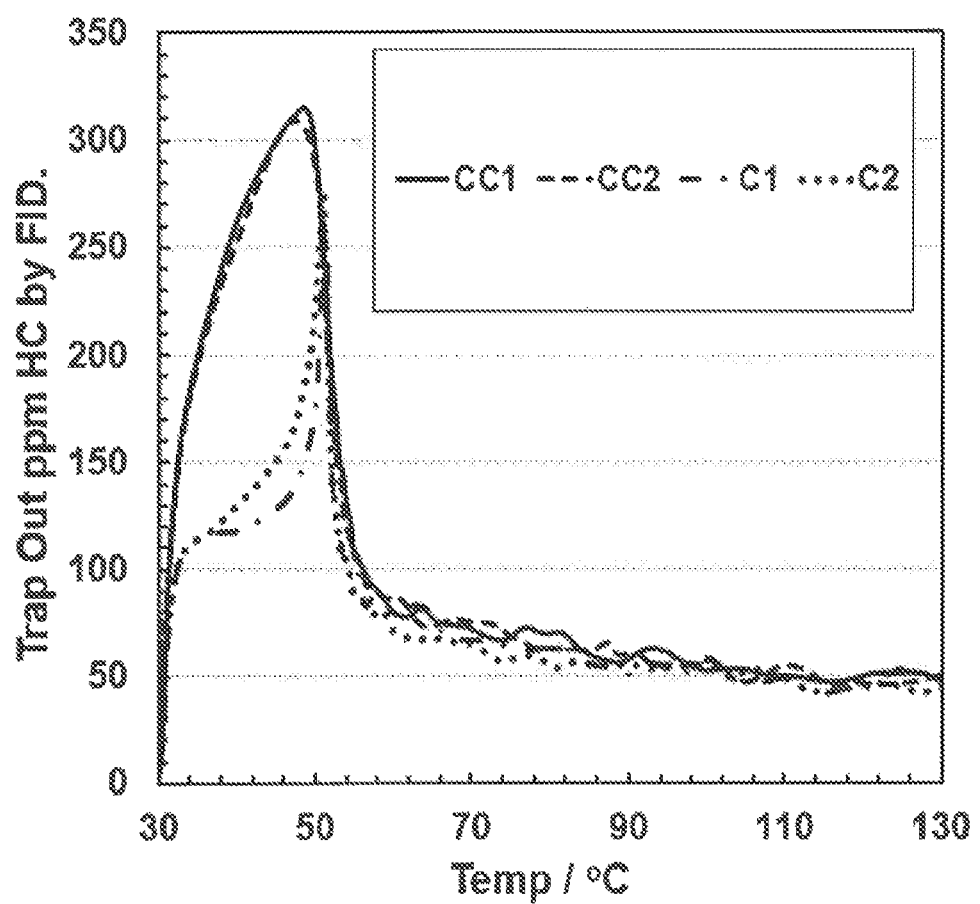
FIG. 3 shows the trapping efficiency over the 1st 130° C. of the temperature ramp of the referenced testing procedure results.
Figure 4:
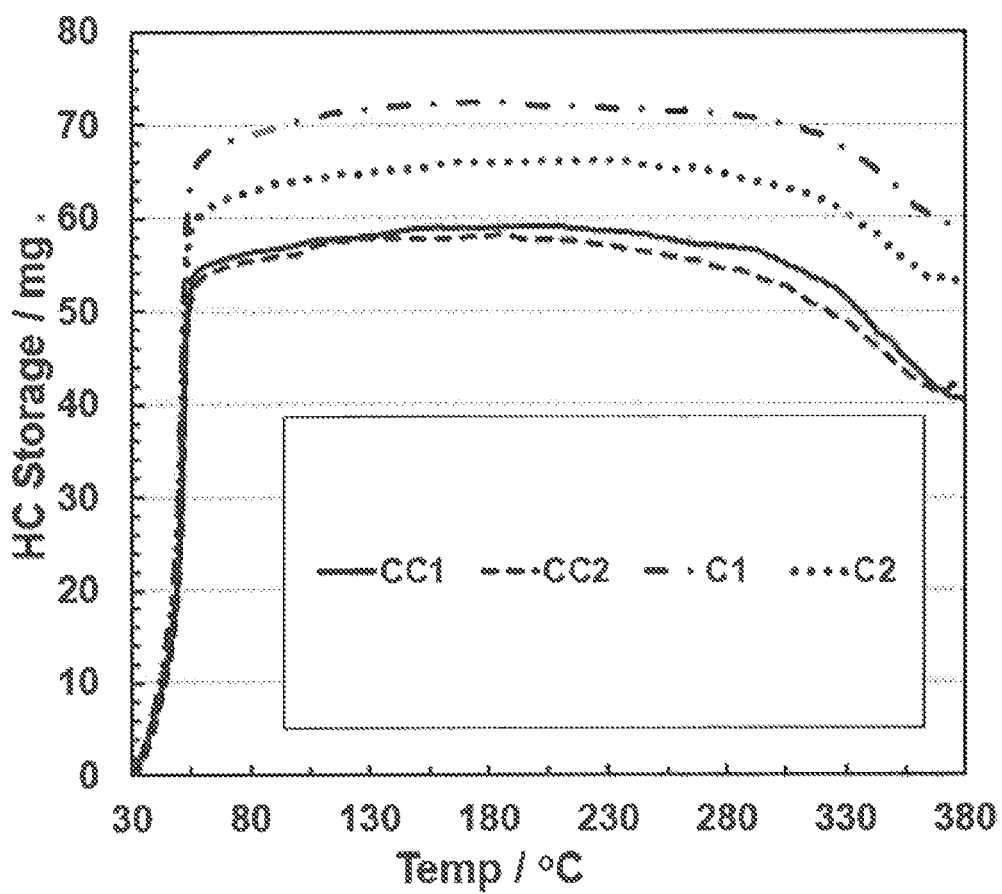
FIG. 4 shows the testing procedure results when there is compared the total HC trapping efficiency as mg of HC over the full test.

In FIGS. 3 and 4 these features are further emphasized when the trapping efficiency over the $1^{st}$ 130° C. of the temperature ramp is considered (FIG. 3) and also when the total HC trapping efficiency as mg of HC over the full test is compared (FIG. 4). Again, it is apparent that the two reference catalysts CC1 and CC2 are identical and clearly weaker than the two inventive catalysts C1 and C2.

Figure 5:
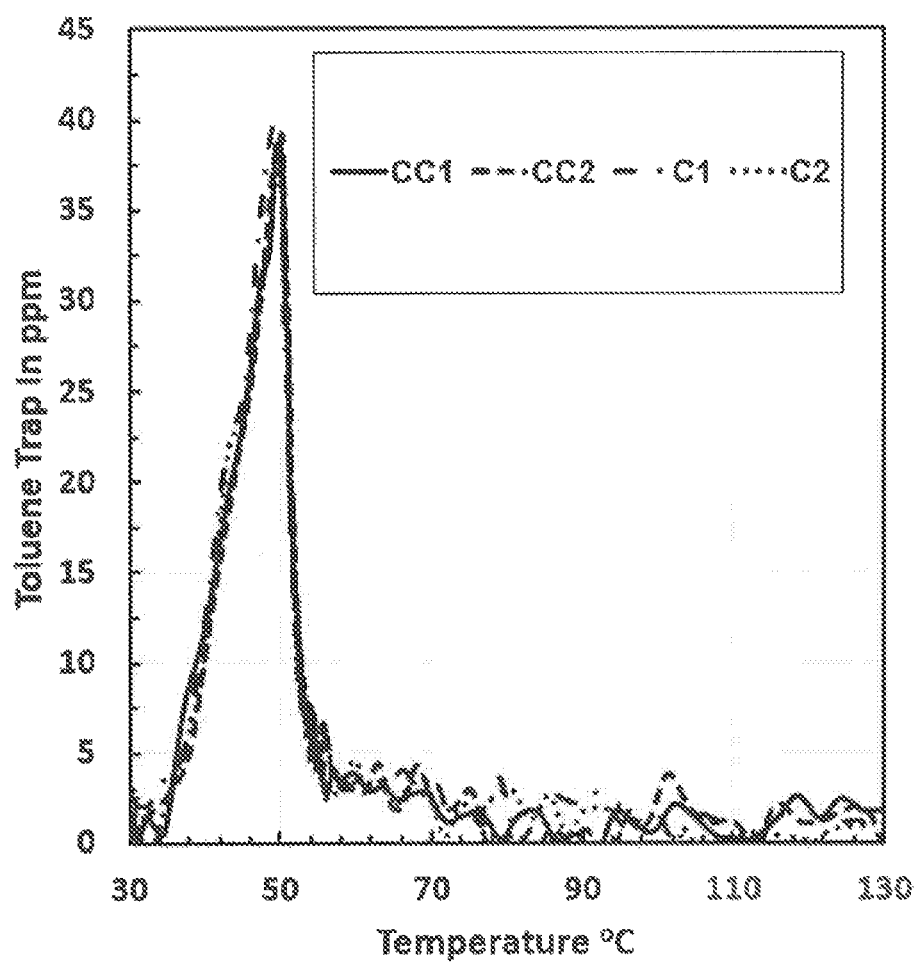
FIGS. 5 and 6 show the testing procedure results for toluene "trap in" (FIG. 5) and "trap out" (FIG. 6)
Figure 6:
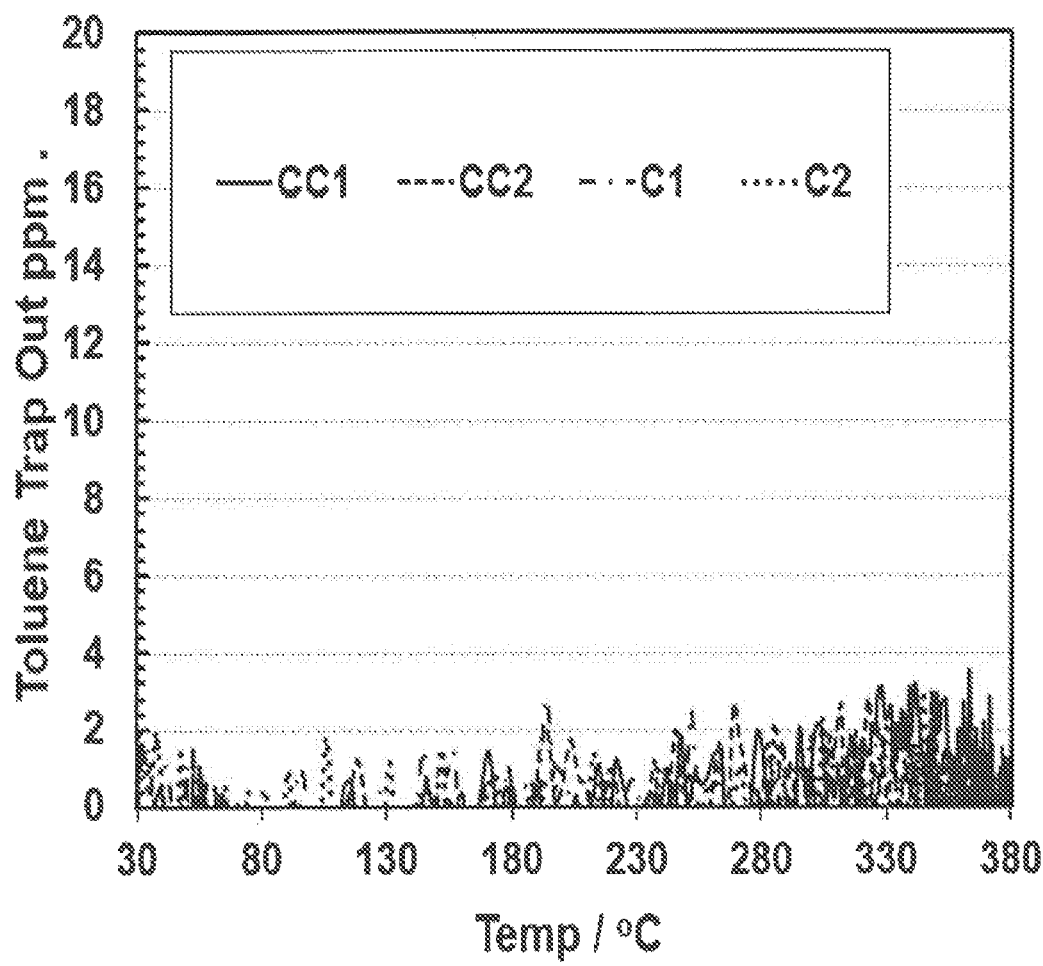
Figure 7:
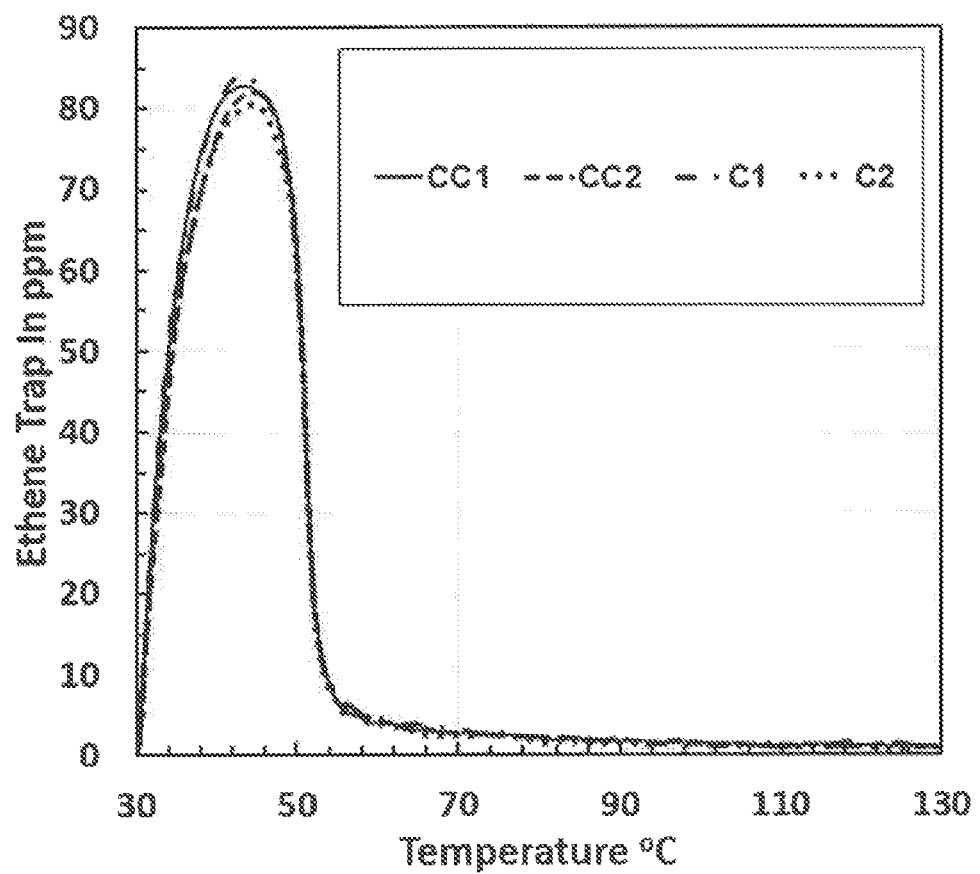
FIGS. 7 to 10 show a comparison of the ethene and propene concentrations "trap in" and "trap out" of CC1, CC2, Cl and C2.
Figure 8:
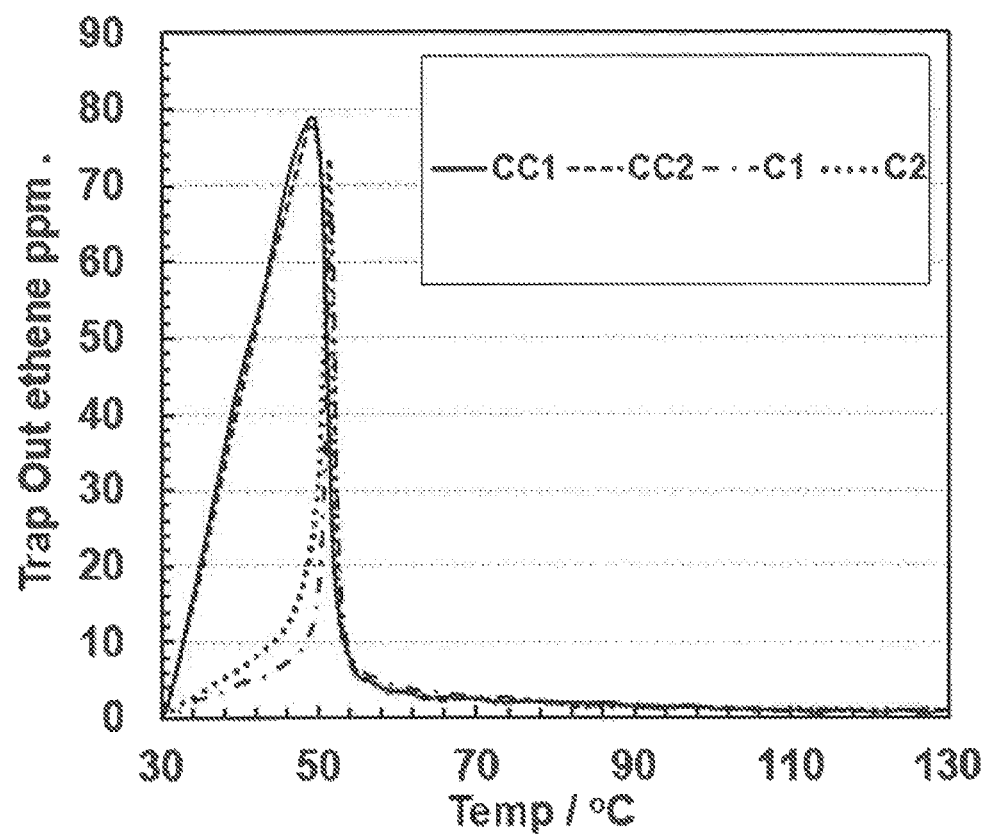
Figure 9:
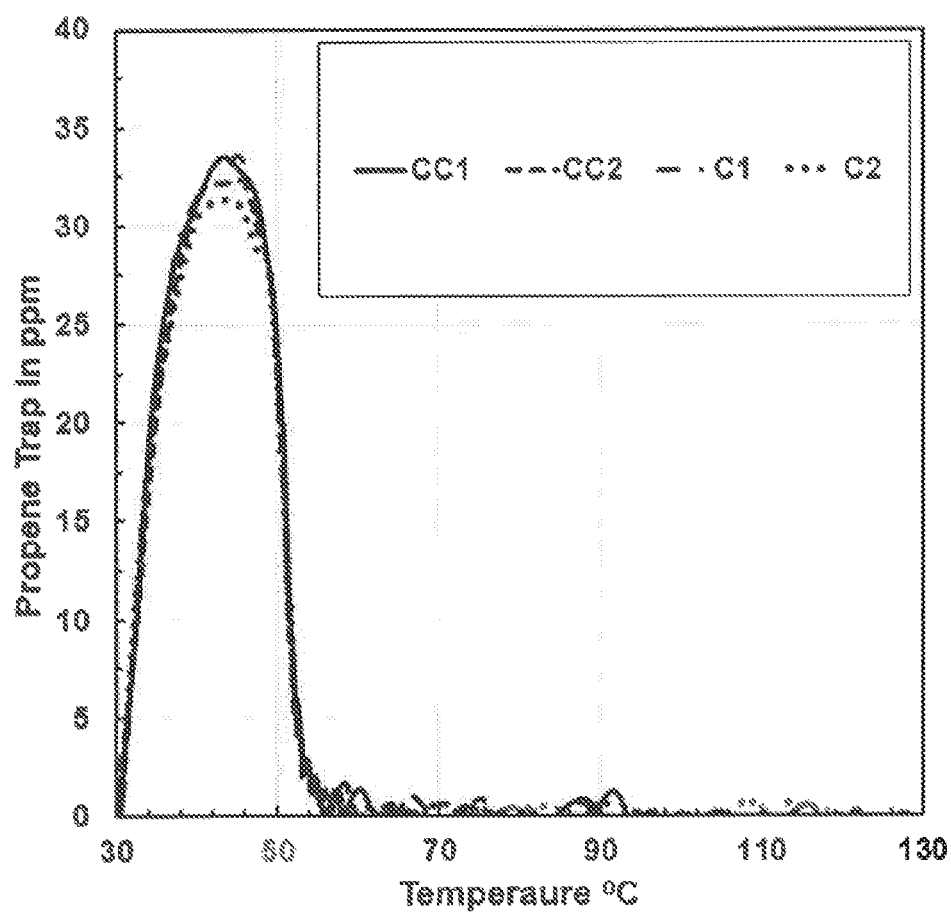
Figure 10:
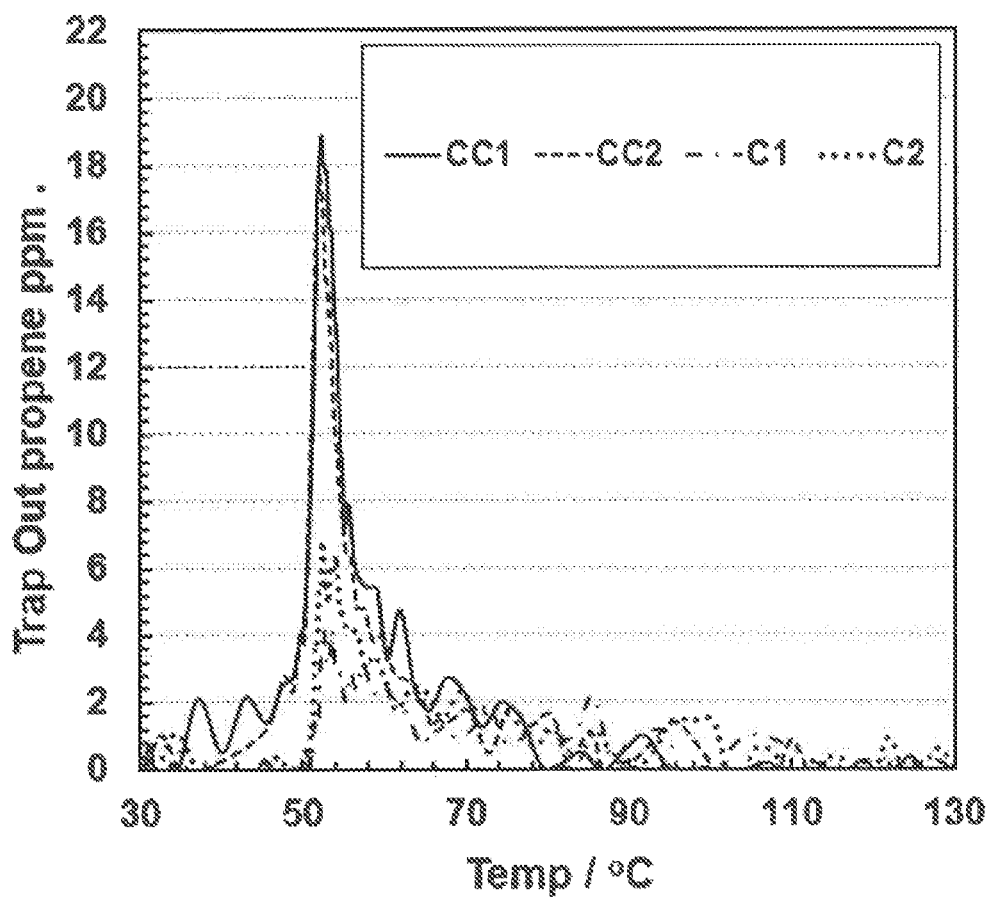

In FIGS. 5 and 6 are shown toluene "trap in" (FIG. 5) and "trap out" (FIG. 6). All the toluene going into the trap is trapped but no toluene is exiting the trap up to 330° C.

In FIGS. 7 to 10 are compared the ethene and propene concentrations "trap in" and "trap out" of CC1, CC2, C1 and C2. It is apparent that the trapping of both these alkenes over C1 and C2 is significantly greater than CC1 and CC2.

Figure 11:
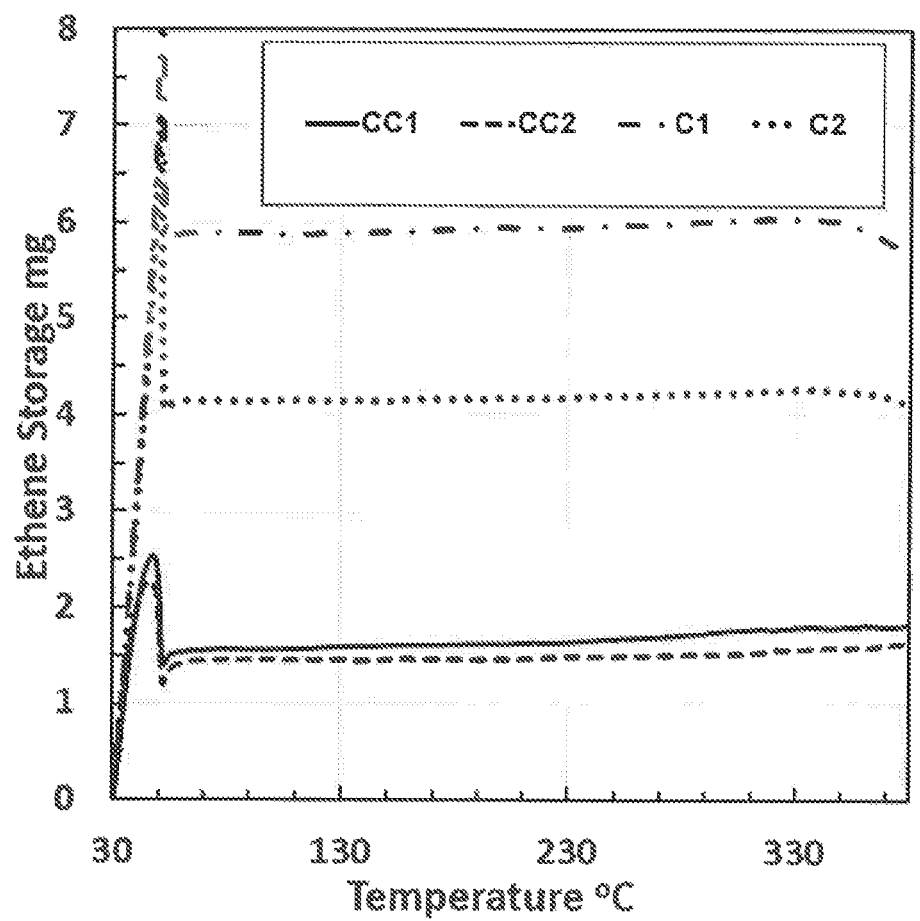
FIGS. 11 and 12 show the test results for when the mg of ethene (FIG. 11) and propene (FIG. 12) stored are compared over the full test.
Figure 12:
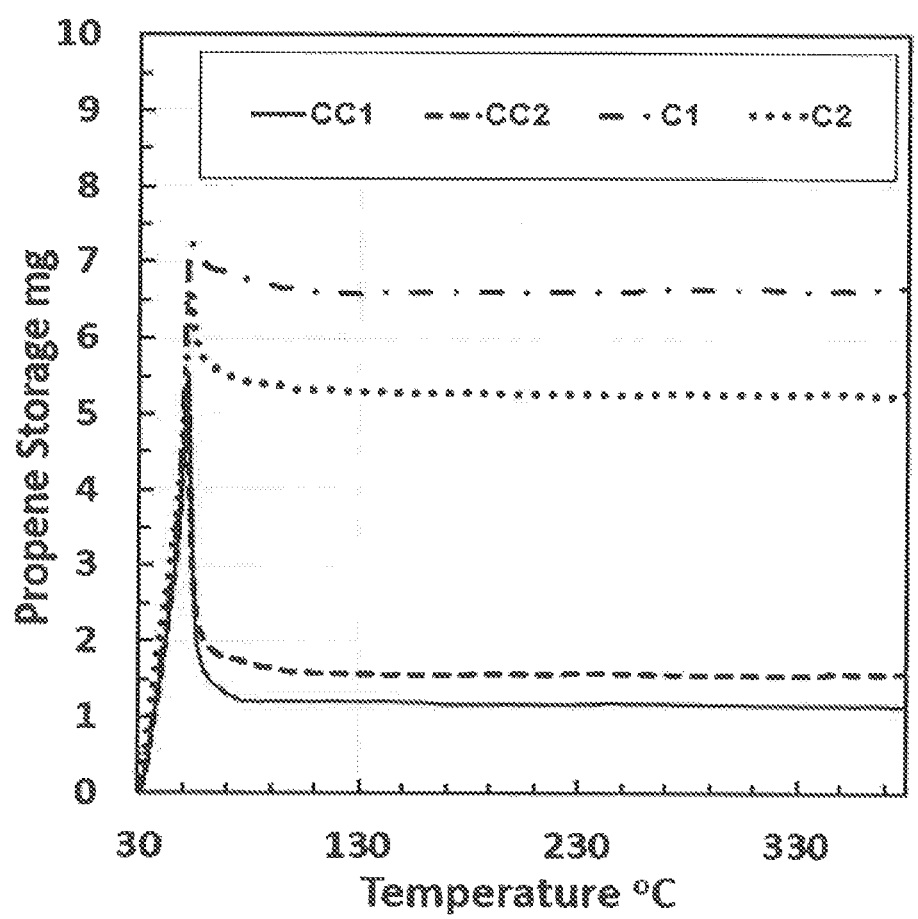
Figure 13:
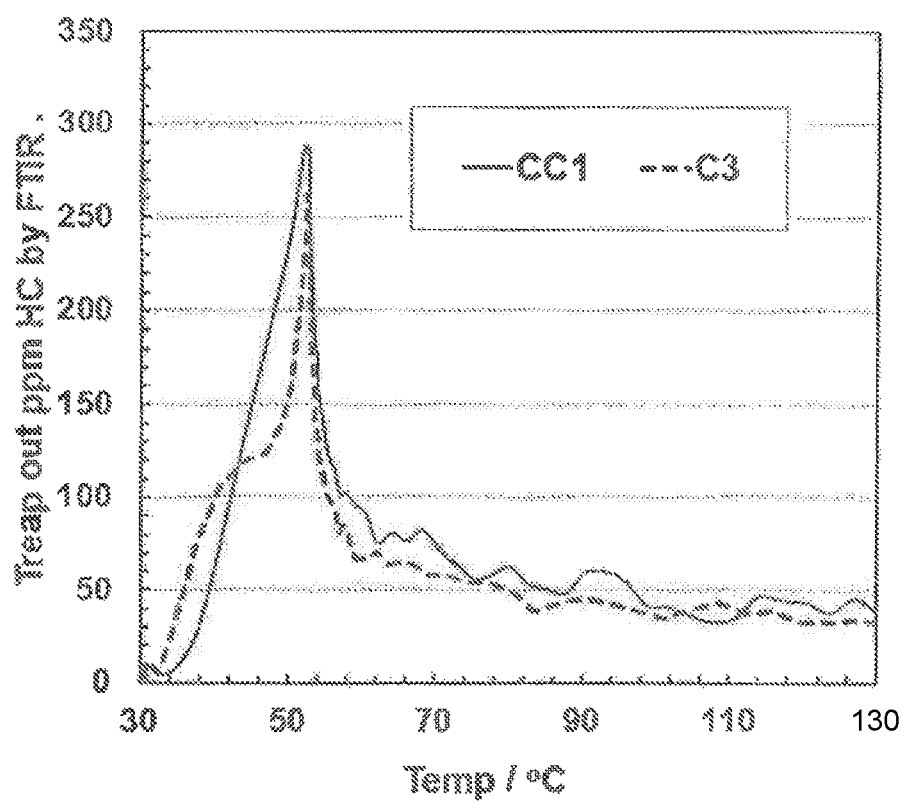
FIGS. 13 to 16 show the advantages of C3 when compared to CC1 as regards total HC and ethene trapping.
Figure 14:
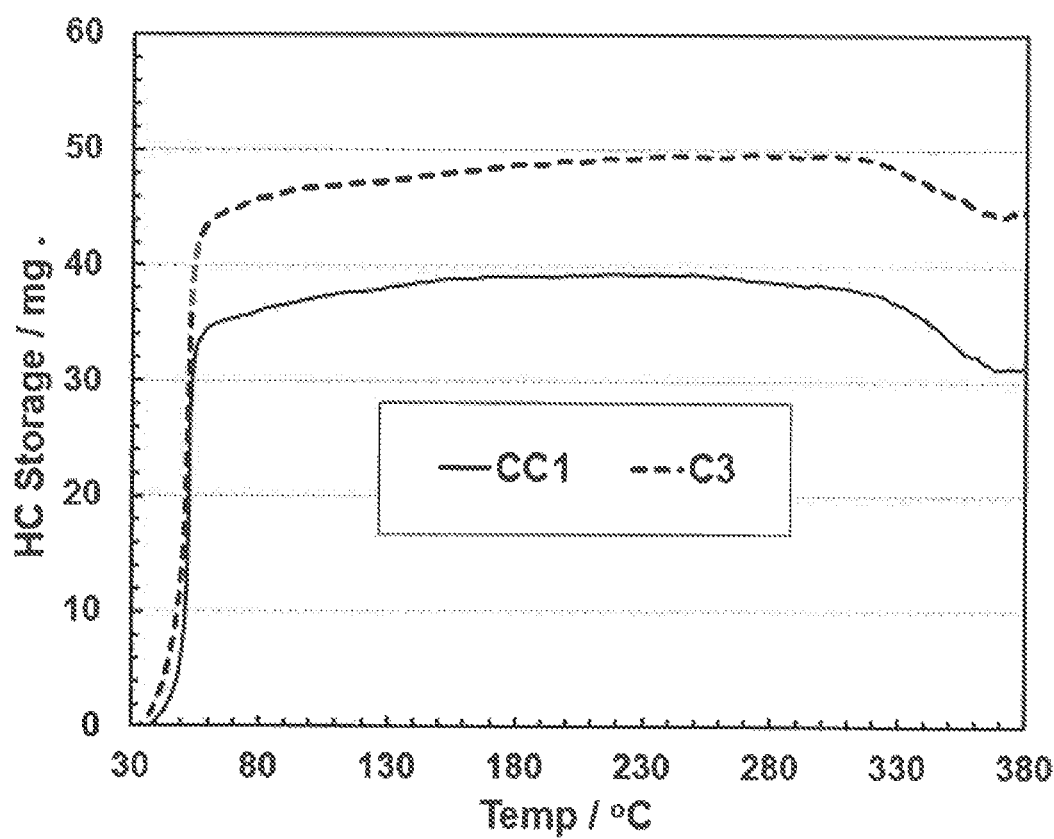
Figure 15:
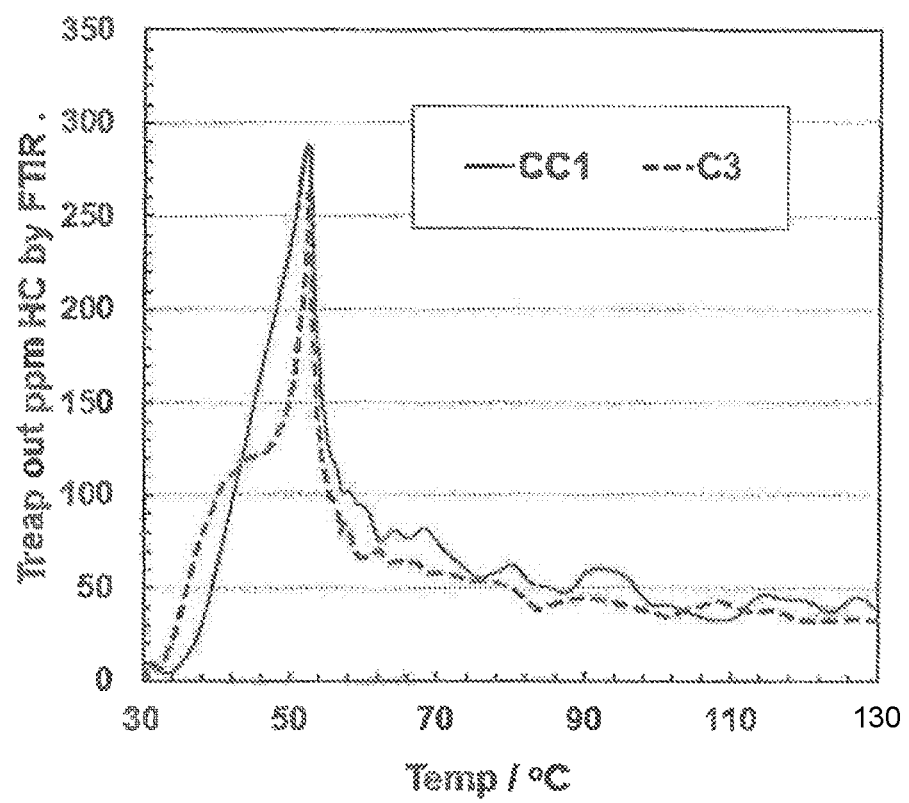
Figure 16:
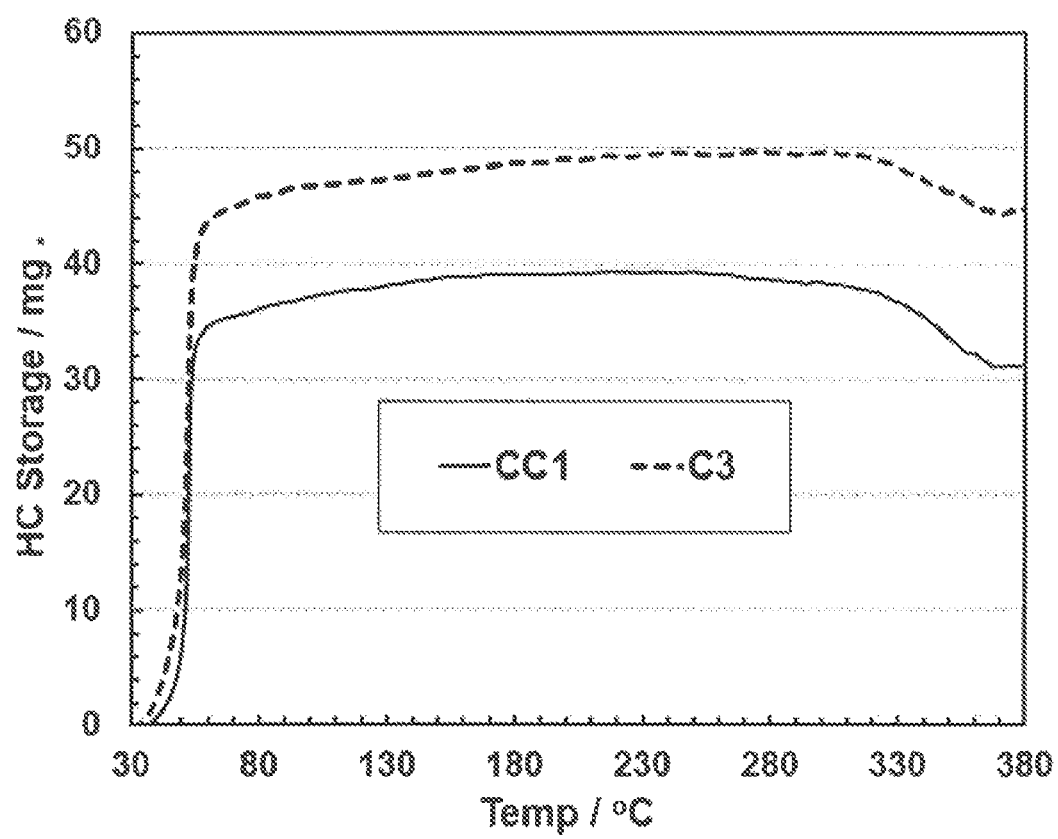

The advantages of C1 and C2 are further illustrated in FIGS. 11 and 12. Here the mg of ethene (FIG. 11) and propene (FIG. 12) stored is compared over the full test. Again, it is dearly evident that C1 and C2 with the PGM/OSC in the trap layer store ethene and propene more effectively than CC1 and CC2.

FIGS. 13 to 16 show advantages of C3 when compared to CC1 as regards total HC and ethene trapping.

The invention claimed is:

1. Catalyst comprising a carrier substrate of the length L extending between substrate ends a and b and a first washcoat zone which comprises
   a) a zeolite
   b) a compound of a redox active base metal selected from the group consisting of Cu, Ni, Co, Mn, Fe, Cr, Ce, Pr, Tb, Sn and In, and
   c) palladium in oxidic or metallic state fixed to the surface of a support oxide, and wherein the carrier substrate comprises a second washcoat zone which comprises platinum, palladium and/or rhodium.

2. Catalyst according to claim 1, wherein the zeolite belongs to the structure type code BEA, FAU, FER, MFI or MOR.

3. Catalyst according to claim 1, wherein the zeolite is beta zeolite.

4. Catalyst according to claim 1 wherein the zeolite is in an amount of 20 to 90% by weight based on the weight of the catalyst.

5. Catalyst according to claim 1, wherein the redox active base metal is iron.

6. Catalyst according to claim 5, wherein the iron is in form of an iron oxide.

7. Catalyst according to claim 6, wherein the iron oxide is in an amount of 1.0 to 10.0% by weight, based on the weight of the catalyst and calculated as $Fe_2O_3$.

8. Catalyst according to claim 1, wherein the palladium of the first washcoat zone is in an amount of 0.1 to 5% by weight, based on the weight of the catalyst and calculated as palladium metal.

9. Catalyst according to claim 1, wherein the support oxide is in an amount of 1.0 to 50.0% by weight, based on the weight of the first washcoat zone.

10. Catalyst according to claim 1, wherein the support oxide is selected from the group consisting of alumina, alumina/silica mixed oxides, magnesia/alumina mixed oxides, ceria, ceria-zirconia mixed oxides and alumina-ceria mixed oxides.

11. Catalyst according to claim 1, wherein the redox active base metal compound is an oxide and present within and/or on the surface of the zeolite.

12. Catalyst according to claim 1, wherein the carrier substrate is a filter substrate.

13. Catalyst according to claim 1, wherein the carrier substrate comprises a third washcoat zone which comprises a zeolite and is free of palladium.

14. Catalyst according to claim 13, wherein the third washcoat zone is present as a layer directly on the carrier substrate, the first washcoat zone is present as a layer on top of the third washcoat zone and the second washcoat layer is present as a layer on top of the first washcoat layer.

15. Catalyst according to claim 1, wherein the second washcoat zone comprises rhodium but no platinum and no palladium.

16. Method for the adsorption of hydrocarbons contained in the exhaust gas of a combustion engine comprising passing the exhaust gas over a catalyst according to claim 1.

17. Catalyst comprising a carrier substrate of the length L extending between substrate ends a and b and a first washcoat zone which comprises
   a) a zeolite
   b) a compound of a redox active base metal selected from the group consisting of Cu, Ni, Co, Mn, Fe, Cr, Ce, Pr, Tb, Sn and In, and c) palladium in oxidic or metallic state fixed to the surface of a support oxide, and wherein the carrier substrate comprises another washcoat zone which comprises a zeolite and is free of palladium.

18. Catalyst according to claim 17, wherein the another washcoat zone has a zeolite structure that is of a structure code type of BEA or MFI or FAU.

19. Catalyst according to claim 18, wherein the another washcoat zone forms a layer below the first washcoat zone and has an iron compound present within and/or on the surface of the zeolite of the another washcoat zone.

20. Method for the adsorption of hydrocarbons contained in the exhaust gas of a predominately stoichiometric operating combustion engine comprising passing the exhaust gas over a catalyst according to claim 17.

* * * * *